(12) United States Patent
Yu et al.

(10) Patent No.: US 12,135,899 B2
(45) Date of Patent: Nov. 5, 2024

(54) BUFFER MANAGEMENT IN AN ETHERNET SWITCH

(71) Applicant: Infineon Technologies AG, Neubiberg (DE)

(72) Inventors: Longli Yu, Taufkirchen (DE); Manuela Meier, Munich (DE)

(73) Assignee: Infineon Technologies AG, Neubiberg (DE)

( * ) Notice: Subject to any disclaimer, the term of this patent is extended or adjusted under 35 U.S.C. 154(b) by 181 days.

(21) Appl. No.: 17/648,905

(22) Filed: Jan. 25, 2022

(65) Prior Publication Data

US 2023/0236756 A1    Jul. 27, 2023

(51) Int. Cl.
*G06F 3/06* (2006.01)

(52) U.S. Cl.
CPC .......... *G06F 3/0656* (2013.01); *G06F 3/0604* (2013.01); *G06F 3/0631* (2013.01); *G06F 3/0659* (2013.01); *G06F 3/0673* (2013.01)

(58) Field of Classification Search
CPC .... G06F 3/0656; G06F 3/0604; G06F 3/0631; G06F 3/0659; G06F 3/0673; H04L 49/9021; H04L 49/901; H04L 49/90
See application file for complete search history.

(56) References Cited

U.S. PATENT DOCUMENTS

| | | | | |
|---|---|---|---|---|
| 6,279,057 B1 * | 8/2001 | Westby | ............... | G06F 11/1004 710/52 |
| 6,404,752 B1 * | 6/2002 | Allen, Jr. | ............... | H04L 49/351 370/335 |
| 6,681,340 B2 * | 1/2004 | Calvignac | ............. | H04L 1/0063 714/776 |
| 7,130,916 B2 * | 10/2006 | Calvignac | ........... | H04L 49/3081 370/429 |

* cited by examiner

*Primary Examiner* — Farley Abad
*Assistant Examiner* — Richard B Franklin
(74) *Attorney, Agent, or Firm* — Harrity & Harrity, LLP

(57) ABSTRACT

A device may include a buffer memory to buffer frames received or to be transmitted via a plurality of ports of the device. The device may include at least one frame processor to process frames. The device may include a buffer manager to store a frame in the buffer memory. The buffer manager may allocate at least one buffer control block (BCB) to the frame based on storing the frame in the buffer memory. The buffer manager may allocate a frame control block (FCB) to the frame. The FCB may include information that identifies the at least one BCB. The buffer manager may perform one or more queueing operations in association with processing of the frame by the at least one frame processor. The one or more queueing operations may be performed using information associated with the FCB.

20 Claims, 5 Drawing Sheets

BUFFER MANAGEMENT IN AN ETHERNET SWITCH

BACKGROUND

Security is an ever-growing challenge for in-vehicle communications. For example, a degree of difficulty for an attacker to access, disrupt, or otherwise impair a vehicle function should be as high as possible. As another example, customer-specific and private data should be protected from access by an attacker. Ethernet is used as a communication interface in a variety of applications, such as in-vehicle communications. Ethernet protocol standards that provide security for in-vehicle communications are diverse, and there are different security protocols at different Ethernet layers, such as medium access control security (MACsec), Internet protocol security (IPsec), transport layer security (TLS), and datagram TLS (DTLS).

SUMMARY

In some implementations, a device includes a buffer memory to buffer frames received via a plurality of ports of the device or frames to be transmitted via the plurality of ports of the device; at least one frame processor to process frames received via the plurality of ports of the device or frames to be transmitted via the plurality of ports of the device; and a buffer manager to store a frame in the buffer memory, the frame being a frame that was received via a port of the plurality of ports or a frame that is to be transmitted via a port of the plurality of ports, allocate at least one buffer control block (BCB) to the frame based on storing the frame in the buffer memory, allocate a frame control block (FCB) to the frame, the FCB including information that identifies the at least one BCB, and perform one or more queueing operations in association with processing of the frame by the at least one frame processor, the one or more queuing operations being performed using information associated with the FCB.

In some implementations, a buffer manager includes one or more components to obtain a frame, the frame being a frame received via one of a port of a plurality of ports of a device or a frame to be transmitted via a port of the plurality of ports of the device; cause the frame to be stored in a buffer memory of the device, allocate at least one BCB to the frame based on causing the frame to be stored in the buffer memory; allocate an FCB to the frame, the FCB including information that identifies the at least one BCB; and enqueue or dequeue the frame, in association with processing of the frame by a frame processor of the device, the enqueuing or dequeuing being performed using information associated with the FCB.

In some implementations, a method includes causing, by a buffer manager, a frame to be stored in a buffer memory, wherein the frame either was received via a port of a plurality of ports or is to be transmitted via a port of the plurality of ports; allocating, by the buffer manager, at least one BCB to the frame based on causing the frame to be stored in the buffer memory; allocating, by the buffer manager, an FCB to the frame, wherein the FCB includes information that identifies the at least one BCB; and performing one or more queueing operations in association with processing of the frame, wherein the one or more queuing operations are performed using information associated with the FCB.

DETAILED DESCRIPTION

Figure 1A:
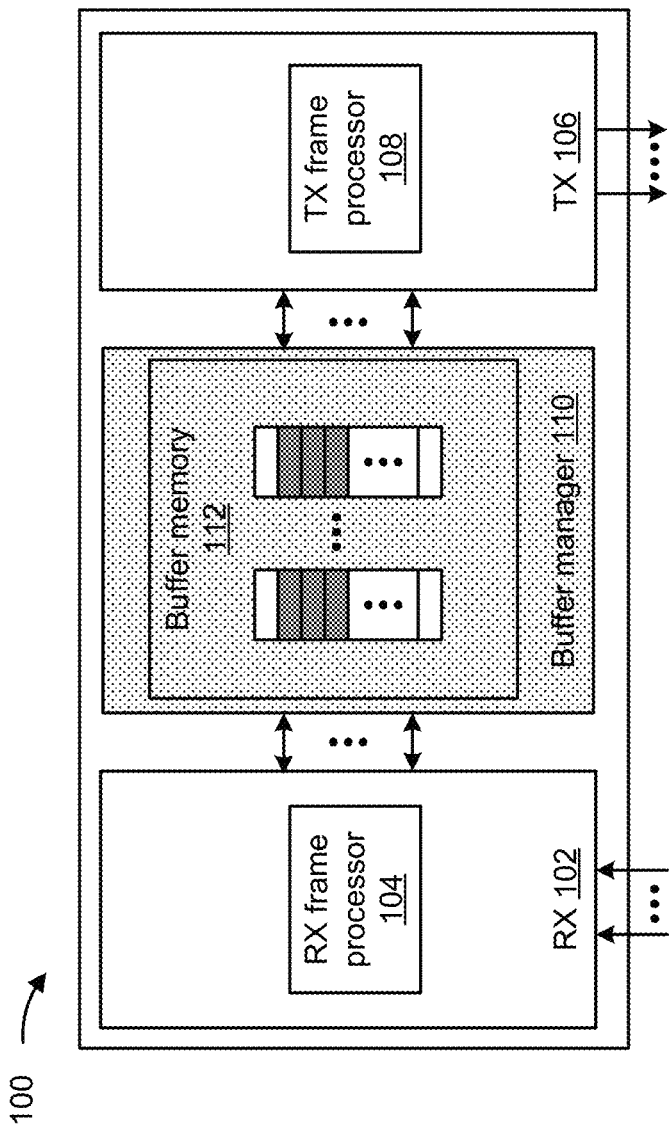
FIGS. 1A and 1B are diagrams associated with an example of a switch that provides improved buffer management, in accordance with various aspects of the present disclosure.

The following detailed description of example implementations refers to the accompanying drawings. The same reference numbers in different drawings may identify the same or similar elements.

As noted above, Ethernet protocol standards that provide security for in-vehicle communications are diverse, and there are different security protocols at different Ethernet layers, such as MACsec, IPsec, TLS, and DTLS. In operation, secure protocol frame processing, frame classification, and frame forwarding required for in-vehicle communications require some degree of data movement and buffering. A buffer management scheme can be employed in an Ethernet switch (or bridge) to manage data movement and buffer. Design of the buffer management scheme is an important factor in terms of managing a physical size of the Ethernet switch, frame processing latency provided by the Ethernet switch, and overall system performance. Notably, as Ethernet speeds increase (e.g., up to 25 gigabits per second (Gbps)), providing efficient buffer management (e.g., at a master control unit (MCU), a master processing unit (MPU), or the like) becomes increasingly more complex and challenging. For example, for a 10 Gbps Ethernet interface, a one millisecond burst may require a megabyte-level buffer size.

One possible Ethernet switch (or bridge) solution uses a distributed buffer scheme in which each MAC port of the device has a dedicated transmit (TX) and receive (RX) buffer that can be used for buffering transmission frames (e.g., frames to be transmitted by a port of the Ethernet switch) or received frames (e.g., frames received at a port of the Ethernet switch). However, since frame processing takes some amount of time, a particular buffer size is always needed to implement such a scheme, meaning that physical area of the device may be increased (e.g., due to a dedicated buffer being needed for each port). Further, this Ethernet switch solution has a frame classification function that serves to parse frame headers, label frames for categories (sometimes referred to as a classification queue or stream), and store or link frames belonging to the same category together. However, a static buffer allocation per classification queue is used under this scheme, meaning a required buffer size may also be undesirably large. Additionally, as a number of Ethernet ports of the switch increases, a total buffer size increases, which increases physical area of the switch as well as production cost. Notably, frame classification, frame forwarding (e.g., forwarding from one Ethernet port to another), and cryptographic engine processing used in such a scheme may require some degree of "smart" buffer and queue management, which can further increase complexity.

Some aspects described herein provide techniques and apparatuses for improved buffer management in an Ethernet switch. For example, in some implementations, a device (e.g., an Ethernet switch or bridge, or the like) may include a buffer memory, a frame processor, and a buffer manager. In some implementations, the buffer manager stores a frame in the buffer memory, the frame being a frame that was received via a port of the device or a frame that is to be transmitted via a port of the device. The buffer manager may allocate at least one buffer control block (BCB) to the frame, and may allocate a frame control block (FCB) to the frame, with the FCB including information that identifies the at least one BCB. The buffer manager performs one or more queueing operations in association with processing of the frame by the frame processor, with the one or more queuing operations being performed using information associated with the FCB. Additional details are provided below.

In some implementations, the techniques and apparatus for improved buffer management described herein eliminate a need for a dedicated (TX/RX) buffer for each MAC port. Further, no store-and-forward buffer is needed inside a given MAC port, and no buffer allocation per queue is needed. In this way, frame moving latency at the Ethernet switch may be reduced.

Additionally, in some implementations, the techniques and apparatus for improved buffer management described herein enable a centralized physical buffer to be shared by multiple (e.g., all) ports of the device. The sharing of the centralized physical buffer reduces a need for buffer size overdesign and, therefore, reduces a physical area needed for the Ethernet switch.

Further, in some implementations, the techniques and apparatus for improved buffer management described herein enable frames to be enqueued or dequeued among queues during frame processing. As described in further detail below, a queue may in some implementations be built as a frame link list. Therefore, enqueue and dequeue operations require only an update to a link pointer (rather than requiring frame data to be copied), which minimizes data movement and improves power consumption efficiency. In some implementations, a given frame is associated with an FCB that points to a frame data storage location and to a next frame belonging to a given queue. In some implementations, data that enables safety or security checking can be stored in the FCB.

Figure 1B:
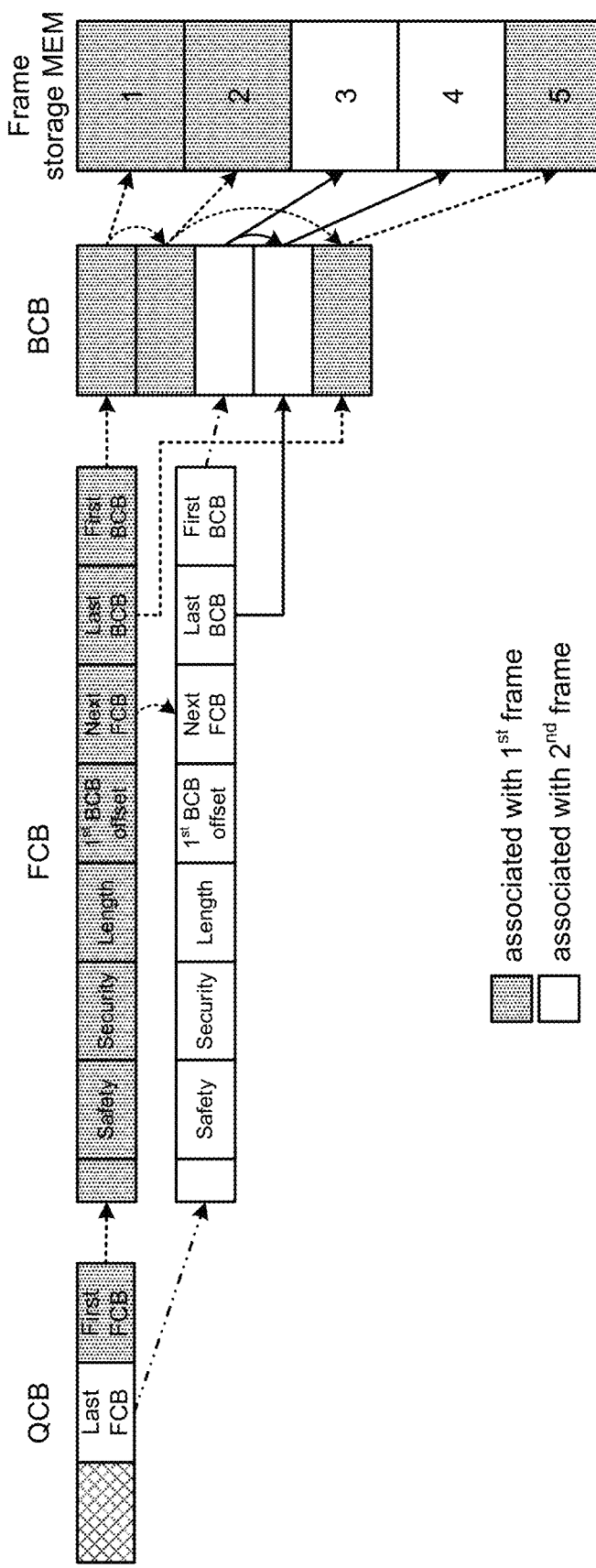

FIGS. 1A and 1B are diagrams associated with an example of a switch 100 that provides improved buffer management, as described herein. The switch 100 may be, for example, an Ethernet switch or bridge. In some implementations, the switch 100 may be included in a communications system, such as an in-vehicle communications system. As shown in FIG. 1A, the switch 100 may include an RX component 102 including an RX frame processor 104, a TX component 106 including a TX frame processor 108, and a buffer manager 110 including a buffer memory 112. The components of the switch 100 are described below, followed by a description of example operation of the switch 100 in association with providing improved buffer management.

RX component 102 includes one or more components associated with receiving frames at switch 100 and processing the frames received at switch 100. In some implementations, RX component 102 includes one or more ports (e.g., one or more MAC ports, not shown in FIG. 1A) via which frames can be received at switch 100. As shown, RX component 102 includes RX frame processor 104.

RX frame processor 104 includes one or more components associated with processing frames received at switch 100. That is, RX frame processor 104 may include one or more components to process frames received via the ports of RX component 102. The one or more components of the RX frame processor 104 may include, for example, an RX multiplexer (e.g., a time-division RX multiplexer), a frame enqueue component, a header/data extractor component, a frame parser, a lookup parameter memory, a parser microcode memory, a cryptographic frame enqueue component, a cryptographic frame processor, a cryptographic engine, a security parameter memory, or another type of component associated with processing a frame received at switch 100.

TX component 106 includes one or more components associated with processing frames to be transmitted by switch 100 and processing the frames to be transmitted by switch 100. In some implementations, TX component 106 includes one or more ports (e.g., one or more MAC ports, not shown in FIG. 1A) via which frames can be transmitted by switch 100. In some implementations, one or more ports of switch 100 may be used for reception and for transmission. For example, a given MAC port of switch 100 may be a TX/RX port via which frames can be transmitted or received. As shown, TX component 106 includes TX frame processor 108.

TX frame processor 108 includes one or more components associated with processing frames to be transmitted by switch 100. That is, TX frame processor 108 may include one or more components to process frames to be transmitted via the ports of the TX component 106. The one or more components of the TX frame processor 108 may include, for example, a TX demultiplexer (e.g., a time division TX demultiplexer), a frame dequeue component, a scheduler component (e.g., a time sensitive networking (TSN)/shaper/scheduler), a cryptographic frame enqueue/dequeue component, a cryptographic engine, a security parameter memory, or another type of component associated with processing a frame to be transmitted by switch 100.

Buffer manager 110 includes one or more components to provide buffer management at switch 100, as described herein. For example, in some implementations, buffer manager 110 may obtain a frame and may store the frame in buffer memory 112 or cause the frame to be stored in buffer memory 112. Here, the frame may be a frame that was received via a port of switch 100 or may be a frame that is to be transmitted via a port of switch 100.

In some implementations, buffer manager 110 may perform buffer management using a multi-level architecture, such as a four-level architecture comprising frame storage memory, buffer control blocks (BCBs), frame control blocks (FCBs), queue control blocks (QCBs). FIG. 1B is a diagram illustrating an example of the four-level architecture that can be utilized by buffer manager 110 in association with performing buffer management. In some implementations, the four-level architecture enables queue and frame data storage to be constructed as a linked list, as described herein.

Frame storage memory corresponds to the memory storage of buffer memory 112. In some implementations, the frame storage memory is partitioned into blocks (e.g., 128 byte blocks, 256 byte blocks, or the like). In some implementations, such partitioning improves memory utilization to enable different frame sizes to be supported (e.g., smaller frames may use only one block for data storage, larger frames may use multiple blocks for data storage). In some implementations, data of a given frame may be stored in one or more blocks of frame storage memory. For example, data of a first frame may be stored in three blocks of frame storage memory (e.g., blocks 1, 2, and 5 as identified in FIG. 1B), while data of a second frame may be stored in two blocks of frame storage memory (e.g., blocks 3 and 4 as identified in FIG. 1B).

A BCB is a block of information that indicates a block of the frame storage memory in which a block of frame data is stored. That is, the BCB may include a pointer that maps to a frame storage memory block storing a portion of frame data of a given frame. In some implementations, a BCB may include a pointer that identifies another BCB associated with the frame. For example, as illustrated in FIG. 1B, a first BCB, associated with the first frame, may point to a first frame storage memory block (e.g., block 1) storing a first portion of frame data, and may further include a pointer to a second BCB, where the second BCB includes a pointer to a second frame storage memory block (e.g., block 2) that stores a second portion of the frame data. Continuing this example, the second BCB may include a pointer to a third BCB, where the third BCB includes a pointer to a third frame storage memory block (e.g., block 5) that stores a third portion of the frame data. In this way, multiple BCBs can be linked to point to all frame storage memory blocks that store data for a given frame. In operation, buffer manager 110 may allocate at least one BCB to a given frame received by switch 100 or to be transmitted by switch 100.

In some implementations, the use of BCBs enable different frame sizes to be accommodated without a need for static memory allocation, thereby reducing physical area overhead (by avoiding a need for a static memory). For example, a length of an Ethernet frame may in a range from 64 bytes to 1.5 kilobytes. Here, a comparatively smaller frame may use a smaller number of data blocks (e.g., a single ne data block) in the frame storage memory, while a comparatively larger frame may use a larger number of data blocks (e.g., two or more multiple data blocks) that are linked together in BCB memory. Thus, when utilizing BCBs, a frame buffer can be dynamically allocated according to actual frame length. Additionally, the total frame storage memory can be sized based on, for example, an average frame length multiplied by a total number of frames (rather than being sized based on a maximum frame length multiplied by the total number of frames). Furthermore, the use of BCBs may facilitate frame modification operation. For example, if one or more frame header fields need be added or removed during processing of the frame), then only the first BCB data block that stores a frame header need be modified, while the remainder of the BCB data blocks (data blocks that store a payload of the frame) need not be modified or otherwise altered.

An FCB is a block of information that includes information that identifies one or more BCBs associated with a frame. For example, as illustrated in FIG. 1B, an FCB associated with the first frame may include a pointer indicating the first BCB associated with the first frame. As further shown, the FCB may further include a pointer indicating a last BCB associated with the frame (e.g., the BCB that maps to frame storage memory block 5). In some implementations, an FCB may include a pointer that identifies another FCB. For example, as indicated in FIG. 1B, the first FCB associated with the first frame may point to a second FCB associated with a second frame. Thus, in some implementations, an FCB associated with a frame may point to an FCB associated with another frame (e.g., a next frame in a queue in which the first and second frames are queued). In this way, multiple FCBs can be linked to point to all FCBs for a given queue. In operation, buffer manager 110 may allocate an FCB to a given frame received by switch 100 or to be transmitted by switch 100.

In some implementations, as indicated in FIG. 1B, an FCB may include additional information associated with a frame. In some implementations, the additional information may include safety data associated with the frame. The safety data can include, for example, a timestamp, or a frame cyclic redundancy check (CRC) value, among other examples. In some implementations, a timestamp may indicate a time at which the frame is received or is to be transmitted. The timestamp can be used, for example, to manage later processing (e.g., TSN related time-sensitive shaping or gating) or preserving an order of frames (e.g., when frames from multiple queues converge, timestamps can be used to determine an order of further forwarding or processing). In some implementations, a CRC value stored in the FCB enables a CRC check to be deferred to or re-performed at a later stage of processing, which provides improved coverage for data integrity and enables use for safety argumentation.

Additionally, or alternatively, the additional information may include security data associated with the frame. The security data may include, for example, a security protocol type, a key index, or a flow identifier (e.g., generated by a frame classifier), among other examples. Additionally, classification information or a cryptographic result can in some implementations be stored in the FCB. In some implementations, the security data can be stored in the FCB for use in later processing of the frame (e.g., cryptographic processing).

Additionally, or alternatively, the additional information may include an indication of a first valid byte in a first BCB data block associated with the frame (identified as "$1^{st}$ BCB offset" in FIG. 1B). In some implementations, the indication the first valid byte in the first BCB data block can be used to enable frame header modification as described above. For example, if one or more frame header fields need be modified or removed, only the first BCB data block needs be modified, and the "$1^{st}$ BCB offset" in the FCB can be updated, accordingly.

Additionally, or alternatively, the additional information may include an indication of a length of the frame (identified as "Length" in FIG. 1B). In some implementations, the indication of the length can enable, for example, calculation of a quantity of valid bytes in a last BCB data block of the frame.

In some implementations, buffer manager 110 may update the FCB (e.g., to include safety data and/or security data) based on a result of processing of the frame. That is, in some implementations, buffer manager 110 may update an FCB based on a result of processing of the frame (e.g., as performed by RX frame processor 104 or TX frame processor 108) so that the FCB includes safety data and/or security data generated, obtained, or otherwise determined in association with processing the frame.

A QCB is a block of information that includes information that identifies one or more FCBs associated with frames in a given queue. For example, as illustrated in FIG. 1B, a QCB associated with a queue may include a pointer indicating the first FCB associated with the first frame. As further shown, the FCB may further include a pointer indicating a last FCB associated with the frame (e.g., the FCB associated with the second frame in the example shown in FIG. 1B). In this way, a QCB can be utilized to construct a queue as a linked list of FCBs. In some implementations, frames belonging to the same category (e.g., the same Internet protocol (IP) connection, the same transmission control protocol (TCP) connection, or the like) can be queued in the same queue.

In some implementations, the buffer manager 110 may perform one or more queuing operations in association with processing of the frame by a frame processor of switch 100 (e.g., RX frame processor 104, TX frame processor 108). The one or more queuing operations may include enqueuing (e.g., assigning a frame to a queue) and/or dequeuing (e.g., removing a frame from a queue) in association with processing the frame. In some implementations, buffer manager 110 performs the one or more queuing operations using information associated with the FCB. For example, in some implementations, buffer manager 110 may enqueue a frame by updating a QCB corresponding to a queue, associated with processing the frame, to include information that identifies the FCB. As another example, in some implementations, buffer manager 110 may dequeue a frame from a queue by removing information that identifies the FCB from a QCB corresponding to the queue. Notably, the one or more queuing operations can be performed by buffer manager 110 without copying the frame, meaning that data movement and copying is minimized, thereby reducing power consumption and reducing processing latency.

In some implementations, buffer manager 110 may maintain a list of available FCBs and BCBs. Upon receiving a frame or determining that a frame is to be transmitted, buffer manager 110 may allocate an FCB and one or more BCBs from these lists and may remove the one or more BCBs and the FCB from the list. Further, when a lifecycle of a frame ends (e.g., when processing of a received frame is completed, when a frame to be transmitted has been transmitted), buffer manager 110 can reclaim the associated BCB and FCB resources and add the one or more BCBs and the FCB back to the list of available BCBs and FCBs. In some implementations, a pair of head and tail pointers of the list can be maintained, and available FCB or BCB entries are linked together (e.g., similar to the manner in which BCBs belonging to one frame are linked or FCBs belonging to one queue are linked). In some implementations, buffer manager 110 can perform allocation of BCB and FCB resources by reading and updating header pointers. In some implementations, buffer manager 110 can perform reclamation of BCB and FCB resources by updating tail pointers.

In operation of switch 100, buffer manager 110 may enqueue a frame received at switch 100 to a queue. For example, the buffer manager 110 may allocate one or more BCBs to the frame and may allocate an FCB to the frame (with the FCB including information indicating the one or more BCBs). Buffer manager 110 can then dequeue the frame (e.g., remove from a queue) for classification of the frame. In some implementations, buffering the frame before performing classification allows performance of a frame classifier to be set to a point that is less than a worst case (e.g., long burst of small frames coming in at line speed) in order to reduce area and cost. In some implementations, after classification is complete, buffer manager 110 can link frames belonging to one classification category to a particular queue using QCBs. In some implementations, when classification results include additional information associated with the frame, (e.g., security data, safety data, or the like) the additional information can be included in (e.g., assigning to) the FCB. In some implementations, security relevant frames can be linked into dedicated security queues for passing to cryptographic engines of switch 100 for further processing.

In some implementations, security queues and frames are separated from non-security frames, and only security masters can access security frames. In some implementations, such separation can be realized by putting security queue access entry points into a continuous address range that is under access control by giving access rights to only security masters, and disabling software direct access to frame storage memory in normal operation mode. In some implementations, frame enqueue and dequeue operations are managed by hardware (e.g., Ethernet hardware). One alternative is to use a partition between security and non-security memories—frame storage memory, frame control block memory (e.g., memory used for FCBs), and queue control memory (e.g., memory used for QCBs).

Returning to FIG. 1A, buffer manager 110 may include (or be communicatively coupled to) buffer memory 112. Buffer memory 112 includes one or more memory components to buffer frames received via ports of switch 100 or frames to be transmitted via ports of switch 100. In some implementations, buffering provided by buffer memory 112 is managed or controlled by buffer manager 110, as described herein. In some implementations, buffer memory 112 is configured to be used for buffering frames for multiple ports of the switch 100. For example, in some implementations, buffer memory 112 is configured to be used for buffering frames for every port of switch 100. In some implementations, the sharing of buffer memory 112 among multiple (e.g., all) ports of switch 100 reduces a need for buffer size overdesign and, therefore, reduces a physical area of switch 100.

In this way, buffer manager 110 can provide a centralized and efficient buffer management scheme that enables: (1) a reduced frame buffer size that is centralized and shared among ports; (2) reduced data movement and copying as needed by functions of security acceleration, classification, and internal port forwarding (3) reduced data movement and copying that reduces processing latency; (4) selection of a performance target of a frame classification or a cryptographic engine setting to a desired point without additional buffering; (5) access to frames by other components (e.g., a CPU, system software, or the like) without additional data movement; (6) passing of security data among different processing stages with separation of security frames and non-security frames; and (7) passing of CRC value and timestamp storage to enable deferred safety checks and improve safety protection coverage. More generally, the buffer manager 110 can provide a buffer management scheme that provides frame safety and security while minimizing area cost.

As indicated above, FIGS. 1A and 1B are provided as examples. Other examples may differ from what is described with regard to FIGS. 1A and 1B. Further, the number and arrangement of components shown in FIG. 1A are provided as an example. In practice, there may be additional components, fewer components, different components, or differently arranged components than those shown in FIG. 1A. Furthermore, two or more components shown in FIG. 1A may be implemented within a single component, or a single component shown in FIG. 1A may be implemented as multiple, distributed components. Additionally, or alternatively, a set of components (e.g., one or more components) of switch 100 may perform one or more functions described as being performed by another set of components of switch 100.

Figure 2:
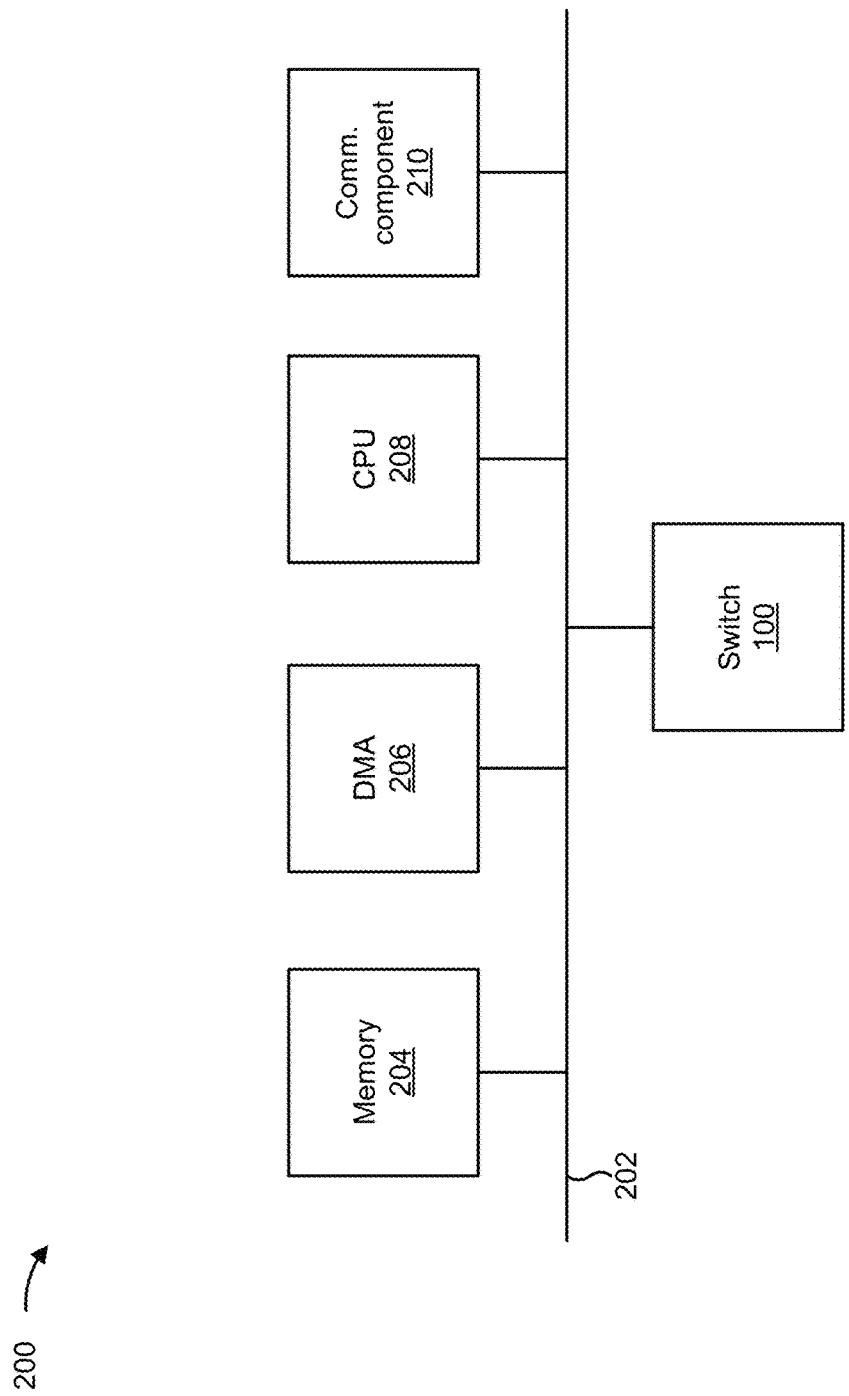
FIG. 2 is a diagram of an example system in which the switch that provides improved buffer management may be implemented, in accordance with various aspects of the present disclosure.

FIG. 2 is a diagram of an example system 200 in which a switch 100 may be implemented. In some implementations, system 200 may be a system on a chip (SoC). As shown in FIG. 2, system 200 may include switch 100, as well as a bus 202, a memory 204, a direct memory access (DMA) 206, a central processing unit (CPU) 208, and a communication component 210.

Switch 100 is component to perform operations associated with improved buffer management, as described herein. Further details regarding the switch 100 are provided elsewhere herein, such as above with respect to FIGS. 1A and 1B.

Bus 202 is a component that enables communication among the components of system 200. For example, bus 202 may enable switch 100 to receive data from memory 204 and/or DMA 206. As another example, bus 202 may enable switch 100 to transmit data to communication component 210.

Memory 204 is a component to store and/or provide data process or to be processed by switch 100. In some implementations, memory 204 may be include a random access memory (RAM), a read only memory (ROM), and/or another type of memory (e.g., a flash memory, a magnetic memory, and/or an optical memory).

DMA 206 is a component to provide data stored by memory 204 to switch 100. In some implementations, DMA 206 provides data stored by memory 204 to switch 100 independent of CPU 208 (i.e., DMA 206 provides direct memory access).

CPU 208 includes a central processing unit, a graphics processing unit, a microprocessor, a controller, a microcontroller, a digital signal processor, a field-programmable gate array, an application-specific integrated circuit, and/or another type of processing component. In some implementations, CPU 208 is implemented in hardware, firmware, or a combination of hardware and software. In some implementations, CPU 208 includes one or more processors capable of being programmed to perform a function.

Communication component 210 includes enables system 200 to communicate with other devices, such as via a wired connection and/or a wireless connection. For example, communication component 210 may include a receiver, a transmitter, a transceiver, a modem, a network interface card, an antenna, and/or the like.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of system 200 may perform one or more functions described as being performed by another set of components of system 200.

Figure 3:
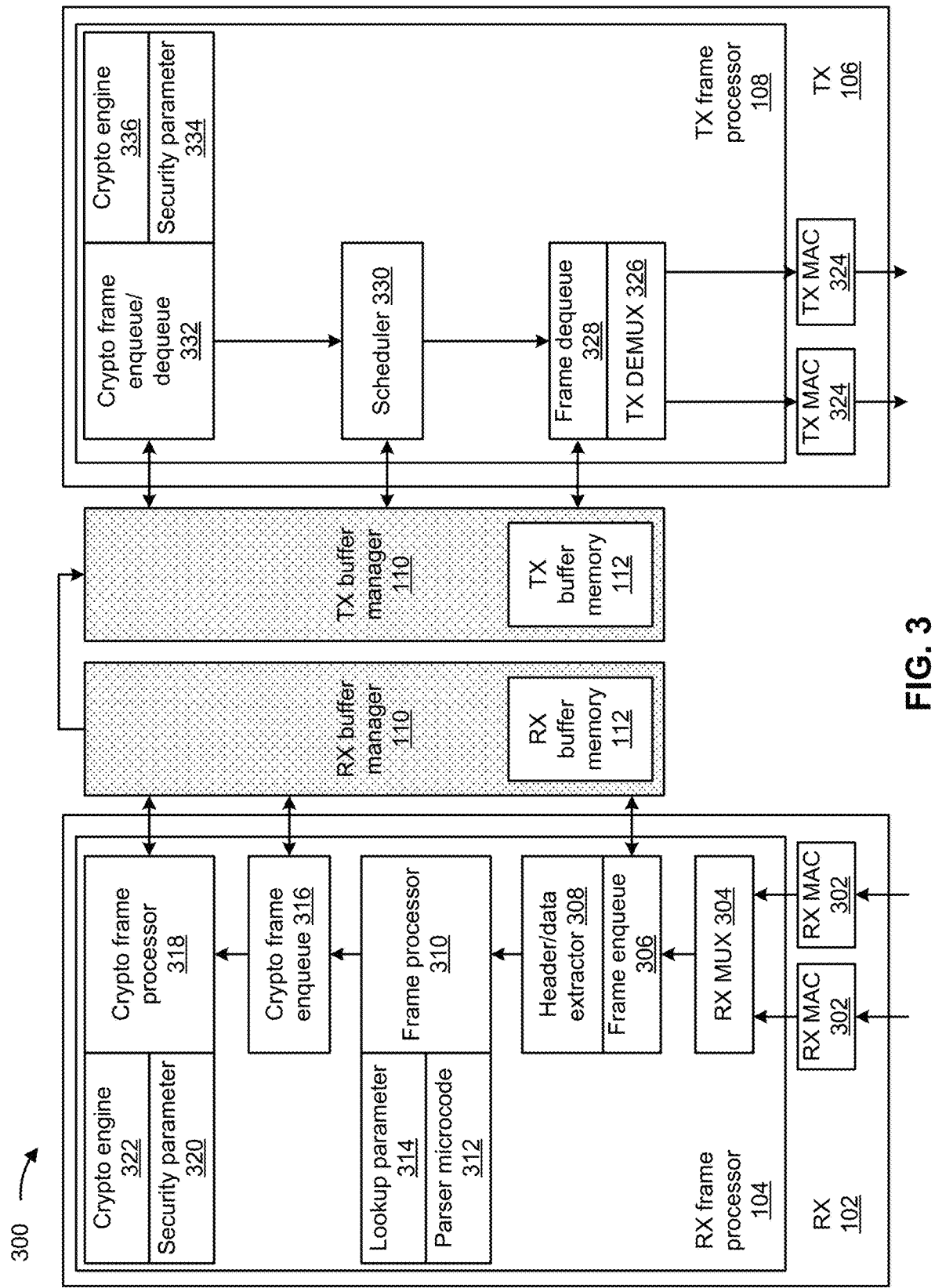
FIG. 3 is a diagram of an example implementation of a switch that provides improved buffer management, in accordance with various aspects of the present disclosure.

FIG. 3 is a diagram of an example implementation 300 of switch 100 that provides improved buffer management, in accordance with various aspects of the present disclosure.

As shown in FIG. 3, in example implementation 300 of switch 100, RX component 102 includes a group of RX MAC ports 302, and RX frame processor 104 includes an RX multiplexer 304, a frame enqueue component 306, a header/data extractor component 308, a frame parser 310, a parser microcode memory 312, a lookup parameter memory 314, a cryptographic frame enqueue component 316, a cryptographic frame processor 318, a security parameter memory 320, and a cryptographic engine 322.

As further shown, TX component 106 includes a group of TX MAC ports 324, and TX frame processor 108 includes a TX demultiplexer 326, a frame dequeue component 328, a scheduler component 330, a cryptographic frame enqueue/ dequeue component 332, a security parameter memory 334, and a cryptographic engine 336. Notably, the components of example implementation 300 are provided for illustrative purposes, and TX/RX implementation in a given switch 100 may differ than that shown in FIG. 3 to account for different requirements or design targets.

As further shown, in example implementation 300, buffer manager 110 may include a component that provides buffer management for frames received by switch 100 (identified as RX buffer manager 110), and a component that provides buffer management for frames to be transmitted by switch 100 (identified as TX buffer manager 110). As further shown, buffer memory 112 may include a buffer memory for frames received by switch 100 (identified as RX buffer memory 112), and a buffer memory for frames to be transmitted by switch 100 (identified as TX buffer memory 112).

As indicated above, FIG. 3 is provided as an example. Other examples may differ from what is described with regard to FIG. 3. Further, the number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) of system 100 may perform one or more functions described as being performed by another set of components of system 100.

Figure 4:
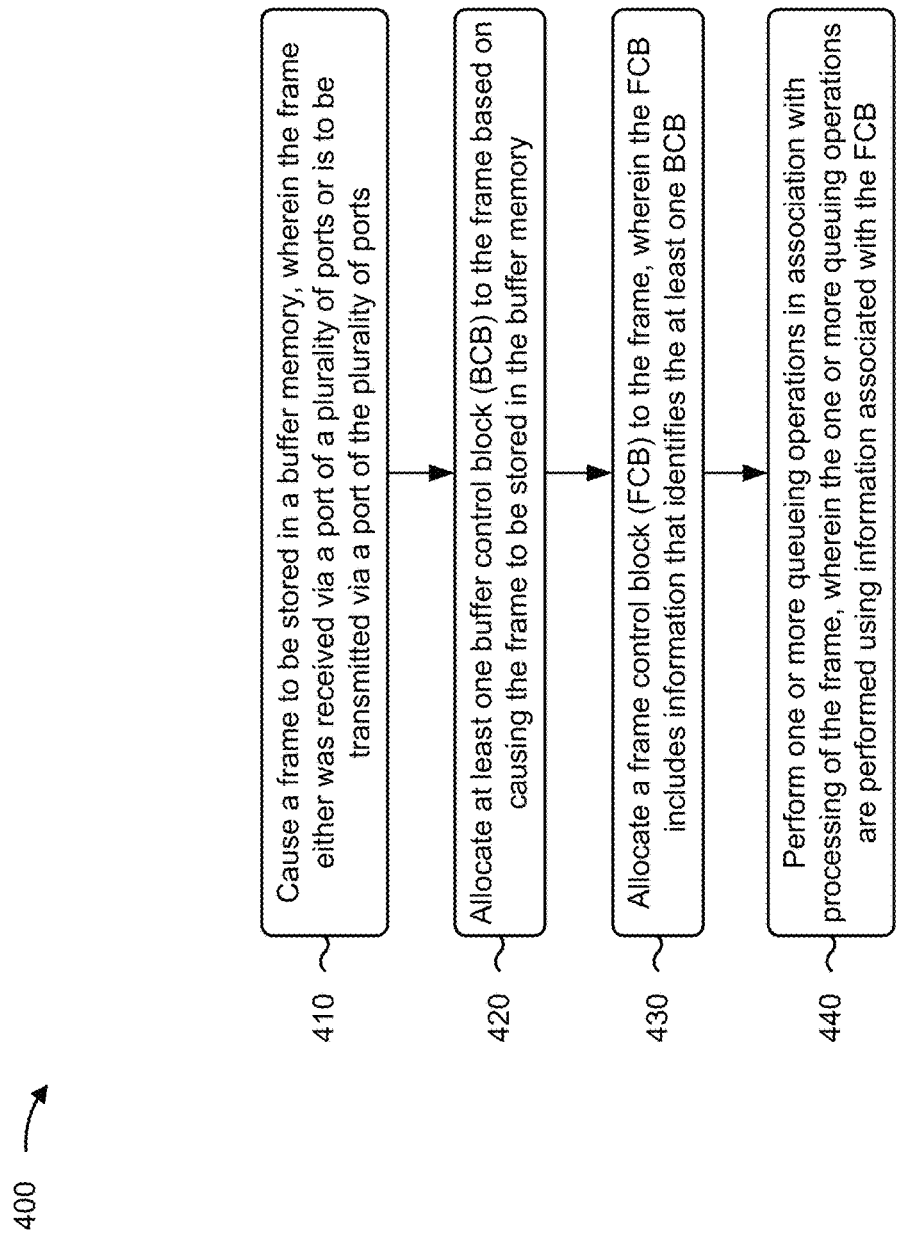
FIG. 4 is a flowchart of an example processes relating to buffer management in a switch, in accordance with various aspects of the present disclosure.

FIG. 4 is a flowchart of an example process 400 associated with buffer management in an ethernet switch. In some implementations, one or more process blocks of FIG. 4 are performed by one or more components of a system 200. For example, one or more process blocks of FIG. 4 may be performed by one or more components of a switch 100, such as RX component 102 (e.g., RX frame processor 104), TX component 106 (e.g., TX frame processor 108), and/or buffer manager 110 (e.g., using buffer memory 112). Additionally, or alternatively, one or more process blocks may be performed by another component or a group of components separate from or including the switch 100, such as a memory 204, a DMA 206, a CPU 208, and/or a communication component 210.

As shown in FIG. 4, process 400 may include causing a frame to be stored in a buffer memory, wherein the frame either was received via a port of a plurality of ports or is to be transmitted via a port of the plurality of ports (block 410). For example, the switch 100 (e.g., buffer manager 110) may cause a frame to be stored in a buffer memory (e.g., buffer memory 112), wherein the frame either was received via a port of a plurality of ports or is to be transmitted via a port of the plurality of ports, as described above.

As further shown in FIG. 4, process 400 may include allocating at least one BCB to the frame based on causing the frame to be stored in the buffer memory (block 420). For example, the switch 100 (e.g., the buffer manager 110) may allocate at least one BCB to the frame based on causing the frame to be stored in the buffer memory, as described above.

As further shown in FIG. 4, process 400 may include allocating an FCB to the frame, wherein the FCB includes information that identifies the at least one BCB (block 430). For example, the switch 100 (e.g., the buffer manager 110) may allocate an FCB to the frame, wherein the FCB includes information that identifies the at least one BCB, as described above.

As further shown in FIG. 4, process 400 may include performing one or more queueing operations in association with processing of the frame, wherein the one or more queuing operations are performed using information associated with the FCB (block 440). For example, the switch 100 (e.g., the buffer manager 110) may perform one or more queueing operations in association with processing of the frame, wherein the one or more queuing operations are performed using information associated with the FCB, as described above.

Process 400 may include additional implementations, such as any single implementation or any combination of implementations described below and/or in connection with one or more other processes described elsewhere herein.

In a first implementation, performing the one or more queuing operations comprises enqueuing the frame for processing by updating a QCB to include information that identifies the FCB, the QCB corresponding to a queue associated with processing the frame.

In a second implementation, alone or in combination with the first implementation, performing the one or more queuing operations comprises dequeuing the frame from a queue by removing information that identifies the FCB from a QCB corresponding to the queue.

In a third implementation, alone or in combination with one or more of the first and second implementations, the one or more queuing operations are performed without copying the frame.

In a fourth implementation, alone or in combination with one or more of the first through third implementations, the buffer memory is configured to be used for buffering frames for every port of the plurality of ports.

In a fifth implementation, alone or in combination with one or more of the first through fourth implementations, the frame is a first frame and the FCB is a first FCB, and the first FCB comprises a field that identifies a second FCB associated with a second frame, the second frame being associated with a same queue as the first frame.

In a sixth implementation, alone or in combination with one or more of the first through fifth implementations, the FCB comprises security data associated with the frame.

In a seventh implementation, alone or in combination with one or more of the first through sixth implementations, the FCB comprises safety data associated with the frame.

In an eighth implementation, alone or in combination with one or more of the first through seventh implementations, the buffer manager is further to update the FCB based on a result of processing the frame.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
 a buffer memory to buffer frames received via a plurality of ports of the device or frames to be transmitted via the plurality of ports of the device;
 at least one frame processor to generate security data based on processing process frames received via the plurality of ports of the device or frames to be transmitted via the plurality of ports of the device,
  wherein the security data indicates one or more of a security protocol type, a key index, or a flow identifier; and
 a buffer manager to:
  store a frame in the buffer memory, the frame being a frame that was received via a port of the plurality of ports or a frame that is to be transmitted via a port of the plurality of ports, allocate a first buffer control block (BCB) to a first portion of the frame and a second BCB to a second portion of the frame based on storing the frame in the buffer memory,
   wherein the first BCB includes information that indicates a first block of the buffer memory in which the first portion of the frame is stored and information that identifies the second BCB, and
   wherein the second BCB includes information that indicates a second block of the buffer memory in which the second portion of the frame is stored,
allocate a frame control block (FCB) to the frame, the FCB including the security data and information that identifies at least one of the first BCB or the second BCB, and
perform one or more queueing operations in association with processing of the frame by the at least one frame processor, the one or more queuing operations being performed using information associated with the FCB.

2. The device of claim 1, wherein the buffer memory is configured to be used for buffering frames for every port of the plurality of ports.

3. The device of claim 1, wherein the buffer manager, when performing the one or more queuing operations, is to enqueue the frame by updating a queue control block (QCB) corresponding to a queue, associated with processing the frame, to include information that identifies the FCB.

4. The device of claim 1, wherein the buffer manager, when performing the one or more queuing operations, is to dequeue the frame from a queue by removing information that identifies the FCB from a queue control block (QCB) corresponding to the queue.

5. The device of claim 1, wherein the one or more queuing operations are performed without copying the frame.

6. The device of claim 1, wherein the frame is a first frame and the FCB is a first FCB, and the first FCB comprises a field that identifies a second FCB associated with a second frame, the second frame being associated with a same queue as the first frame.

7. The device of claim 1, wherein the FCB further comprises safety data associated with the frame, wherein the safety data is different from the security data.

8. The device of claim 1, wherein the buffer manager is further to update the FCB based on a result of processing the frame.

9. A buffer manager comprising:
one or more components, the one or more components including at least one hardware component, the one or more components being configured to:
   obtain a frame, the frame being a frame received via one of a port of a plurality of ports of a device or a frame to be transmitted via a port of the plurality of ports of the device;
   cause the frame to be stored in a buffer memory of the device,
   allocate a first buffer control block (BCB) to a first portion of the frame and a second BCB to a second portion of the frame based on causing the frame to be stored in the buffer memory,
      wherein the first BCB includes information that indicates a first block of the buffer memory in which the first portion of the frame is stored and information that identifies the second BCB, and
      wherein the second BCB includes information that indicates a second block of the buffer memory in which the second portion of the frame is stored;
   allocate a frame control block (FCB) to the frame, the FCB including security data and information that identifies at least one of the first BCB or the second BCB,
      wherein the security data indicates one or more of a security protocol type, a key index, or a flow identifier; and
   enqueue or dequeue the frame, in association with processing of the frame by a frame processor of the device, the enqueuing or dequeuing being performed using information associated with the FCB.

10. The buffer manager of claim 9, wherein the one or more components, when enqueuing the frame, are to update a queue control block (QCB) associated with a queue to include information that identifies the FCB.

11. The buffer manager of claim 9, wherein the one or more components, when dequeuing the frame, are to remove information that identifies the FCB from a queue control block (QCB) corresponding to a queue.

12. The buffer manager of claim 9, wherein the enqueuing or dequeuing of the frame are performed without copying the frame.

13. The buffer manager of claim 9, wherein the frame is a first frame and the FCB is a first FCB, and the first FCB comprises a field that identifies a second FCB associated with a second frame, the second frame being associated with a same queue as the first frame.

14. The buffer manager of claim 9, wherein the FCB further comprises safety data associated with the frame, wherein the safety data is different from the security data.

15. The buffer manager of claim 9, wherein the one or more components are further to update the FCB based on a result of processing of the frame performed by the frame processor.

16. A method, comprising:
causing, by a buffer manager, a frame to be stored in a buffer memory,
   wherein the frame either was received via a port of a plurality of ports or is to be transmitted via a port of the plurality of ports;
allocating, by the buffer manager, a first buffer control block (BCB) to a first portion of the frame and a second BCB to a second portion of the frame based on causing the frame to be stored in the buffer memory,
   wherein the first BCB includes information that indicates a first block of the buffer memory in which the first portion of the frame is stored and information that identifies the second BCB, and
   wherein the second BCB includes information that indicates a second block of the buffer memory in which the second portion of the frame is stored;
allocating, by the buffer manager, a frame control block (FCB) to the frame, wherein the FCB includes security data and information that identifies at least one of the first BCB or the second BCB,
   wherein the security data indicates one or more of a security protocol type, a key index, or a flow identifier; and
performing one or more queueing operations in association with processing of the frame,
   wherein the one or more queuing operations are performed using information associated with the FCB.

17. The method of claim 16, wherein performing the one or more queuing operations comprises enqueuing the frame for processing by updating a queue control block (QCB) to include information that identifies the FCB, the QCB corresponding to a queue associated with processing the frame.

18. The method of claim 16, wherein performing the one or more queuing operations comprises dequeuing the frame from a queue by removing information that identifies the FCB from a queue control block (QCB) corresponding to the queue.

19. The method of claim 16, wherein the one or more queuing operations are performed without copying the frame.

20. The method of claim 16, wherein the frame is a first frame and the FCB is a first FCB, and the first FCB comprises a field that identifies a second FCB associated with a second frame, the second frame being associated with a same queue as the first frame.

\* \* \* \* \*